(12) United States Patent
Albano et al.

(10) Patent No.: US 7,834,097 B2
(45) Date of Patent: *Nov. 16, 2010

(54) FLUOROELASTOMERS

(75) Inventors: Margherita Albano, Milan (IT); Milena Stanga, Varese (IT); Francesco Triulzi, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/162,099

(22) PCT Filed: Jan. 15, 2007

(86) PCT No.: PCT/EP2007/050352

§ 371 (c)(1),
(2), (4) Date: Jul. 24, 2008

(87) PCT Pub. No.: WO2007/085542

PCT Pub. Date: Aug. 2, 2007

(65) Prior Publication Data

US 2009/0005511 A1    Jan. 1, 2009

(30) Foreign Application Priority Data

Jan. 27, 2006   (IT)   .......................... MI2006A0138

(51) Int. Cl.
  *C08F 14/18*   (2006.01)

(52) U.S. Cl. ............. 525/326.2; 525/200; 525/199; 525/231; 526/242; 526/266; 526/247; 526/253; 526/250; 526/252; 526/249

(58) Field of Classification Search ............. 526/252, 526/253, 247; 525/200, 331.1, 326.2
See application file for complete search history.

(56) References Cited

U.S. PATENT DOCUMENTS

| | | | |
|---|---|---|---|
| 2003/0004273 A1* | 1/2003 | Apostolo et al. | 525/199 |
| 2003/0088040 A1* | 5/2003 | Arrigoni et al. | 526/255 |
| 2005/0245691 A1* | 11/2005 | Stanga et al. | 525/331.1 |
| 2007/0093625 A1* | 4/2007 | Arrigoni et al. | 526/253 |

FOREIGN PATENT DOCUMENTS

| | | | |
|---|---|---|---|
| EP | 1 621 557 A | | 2/2006 |
| JP | 2004-163927 A | | 6/2004 |
| JP | 2004-219579 A | | 8/2004 |
| JP | 2004-163927 | * | 10/2004 |

* cited by examiner

*Primary Examiner*—Vasu Jagannathan
*Assistant Examiner*—Robert C Boyle
(74) *Attorney, Agent, or Firm*—Arent Fox LLP

(57) ABSTRACT

VDF-based curable fluorelastomers, having a glass transition temperature from $-10°$ C. to $-35°$ C., comprising: B) monomer of formula: $CF_2$=$CFOCF_2OCF_3$ (a), C) one or more comonomers selected from: tetrafluoroethylene (TFE), perfluoromethylvinylether (PMVE), perfluoropropene (HFP), and an amount of —COF end groups in the polymer lower than the sensitivity limit of the method which uses the FT-IR spectroscopy described in the present application.

18 Claims, No Drawings

FLUOROELASTOMERS

CROSS-REFERENCE TO RELATED APPLICATION

This application is a National Stage entry of International Application No. PCT/EP2007/050352, filed Jan. 15, 2007, the entire specification and claims of which are incorporated herewith by reference.

The present invention relates to VDF fluoroelastomers having a glass transition temperature between −10° C. and −35° C., preferably from −20° C. to −34° C., still more preferably between −25° C. and −34° C., showing an improved combination of chemical resistance, mechanical properties and compression set in a wide range of temperatures, high and low temperatures.

More specifically the present invention refers to fluoroelastomers substantially free from —COF polymer end groups, these end groups being undetectable by the method indicated hereinafter. The fluoroelastomers of the present invention are obtainable by a polymerization process with an improved productivity.

It is well known that fluoroelastomers are polymers particularly useful in the automotive, aerospace, oil, petrochemical and electronic industry thanks to their thermal and chemical resistance properties, good mechanical properties and compression set. However it is required that these polymers show an improved combination of the above properties, in particular of a high chemical resistance and an improved elastomeric behaviour in a wide temperature range, at both high and at low temperatures.

Various fluoroelastomers are known in the prior art, however generally the —COF polymer end group values are not reported. The Applicant has unexpectedly and surprisingly found that, when the polymers have —COF end groups, the fluoroelastomers do not show high mechanical and elastomeric properties.

For various prior art fluoroelastomers the glass transition temperature (Tg) is reported. However in the prior art the combination of a low Tg, improved chemical resistance, absence of —COF end groups in fluoroelastomers, and improved mechanical and elastomeric properties at high and at low temperatures is not obtained.

U.S. Pat. No. 3,132,123 describes the preparation of perfluoroalkylvinylethers, of the corresponding homopolymers and copolymers with TFE. Homopolymers are obtained under extreme experimental conditions, by using polymerization pressures from 4,000 to 18,000 atm. The general formula of the described vinylethers is the following:

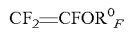

wherein $R^o_F$ is a perfluoroalkyl radical from 1 to 5 carbon atoms. Tests carried out by the Applicant have shown that the homopolymer Tg is not very low and is of the order of −6° C.

U.S. Pat. No. 3,450,684 relates to vinylethers of formula:

wherein $X^o$=F, Cl, $CF_3$, H and n' can range from 1 to 20.

Also homopolymers obtained by UV polymerization are reported. The exemplified copolymers are not characterized by their mechanical and elastomeric properties at low temperatures.

U.S. Pat. No. 3,635,926 relates to the emulsion copolymerization of perfluorovinylethers with TFE, showing that the presence of —COF acylfluoride end groups makes the polymers unstable. The same phenomenon was already reported in U.S. Pat. No. 3,085,083 in the polymerization systems of perfluorovinylethers in solvent.

U.S. Pat. No. 3,817,960 relates to the preparation and polymerization of perfluorovinylethers of formula:

wherein n" can range from 1 to 5. The vinylether synthesis is complex. No characterization data on the above properties are reported.

U.S. Pat. No. 4,487,903 relates to the preparation of fluoroelastomer copolymers by using perfluoro vinylethers of formula:

wherein $n^o$ ranges from 1 to 4; $Y^o$=F, $C_1$, $CF_3$, H; $X^2$ can be $C_1$-$C_3$ perfluoroalkyl group, $C_1$-$C_3$ ω-hydroperfluoroalkyl group, $C_1$-$C_3$ ω-chloroperfluoroalkyl group. The polymer has a content of fluorovinylether units ranging from 15 to 50% by moles. These vinylethers give copolymers which at low temperatures have better properties than those of the above PVE (perfluoro-propylvinylether) and MVE type perfluorovinylethers. In the patent it is disclosed that in order to have good properties at low temperatures, the presence of at least two ether bonds in the side chain adjacent to the double bond is required. Furthermore from the patent it results that for $n^o$ values higher than 4 it is difficult to purify the monomers and the effect on the decrease of the polymer $T_g$ is lower. Besides, the reactivity of the described vinylethers is very low and is difficult to obtain polymers having a high molecular weight capable to give good elastomeric properties for the indicated applications. A TFE/perfluorovinylether copolymer ($n^o$=2) 31/69% weight with Tg of −32° C. is exemplified. However the polymer is obtained with very long reaction times (96 hours of polymerization). Also in this case no characterization data of the cured elastomer are given.

EP 130,052 describes the perfluorovinylpolyether (PVPE) polymerization which brings to amorphous perfluoropolymers with $T_g$ ranging from −15 to −100° C. In the patent copolymers and terpolymers of TFE and MVE with vinylethers (PVPE) of formula:

are described, wherein n''' ranges from 3 to 30 and $R^o_f$ is a perfluoroalkyl. Due to purification difficulties, the used vinylethers are vinylether mixtures with different n''' values. According to said patent, the most marked effect on the $T_g$ decrease is pointed out when n''' is equal to or higher than 3, preferably higher than 4. According to the polymerization examples described in said patent, the final mass of the polymer, besides the hot and under vacuum treatment, must then be washed with Freon® TF to remove all the unreacted monomer (PVPE). From the Examples it results that the reactivity of all the described monomers (PVPE) is poor.

U.S. Pat. No. 5,401,818 relates to the preparation of perfluorovinylethers of formula:

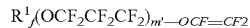

(wherein $R^1_f$ is a $C_1$-$C_3$ perfluoroalkyl radical and m' an integer ranging from 1 to 4) and of the corresponding copolymers with improved properties at low temperatures. The preparation of said perfluorovinylethers takes places through 7 steps, some of them have very low yields and comprise also a perfluorination with elemental $F_2$. The reactivity of said perfluorovinylethers is anyway low.

Other problems shown in the prior art relate to the low reactivity of the perfluorovinylethers, which requires the recovery of the unreacted monomers from the reaction raw products (patent GB 1,514,700), and the stability problems for the polymers having —C(O)F end groups (U.S. Pat. No. 3,635,926). The latter can be further transformed with suitable reactants to increase the stability of the fluorinated polymer (EP 178,935).

Perfluorooxyalkylvinylethers are furthermore used to confer to the fluorinated rubbers good properties at low temperatures, and in particular to lower the glass transition temperature (Tg).

By increasing the perfluorooxyalkylene units of the perfluorooxyalkylene substituent, the Tg of the corresponding obtainable amorphous copolymers decreases, but at the same time the vinylether reactivity drastically decreases, making difficult or impossible to obtain polymers having a sufficiently high molecular weight to confer to the polymers the desired elastomeric properties and besides making the problems previously shown for the recovery of the unreacted monomer from the polymerization raw products or from the polymer itself more marked (U.S. Pat. No. 4,487,903-EP 130,052).

Other patents describing vinylethers for obtaining fluoroelastomers are known. See U.S. Pat. No. 6,255,536, EP 1,117,710, WO 99/48939 and U.S. Pat. No. 5,696,216.

More specifically fluoroelastomers suitable for the preparation of O-rings, having units deriving from vinilydenfluoride (VDF), hexafluoropropene (HFP), perfluoroalkylvinylethers (PAVE) such as for example methylvinylether, and optionally tetrafluoroethylene (TFE) are known. The fluoroelastomers are ionically curable and show high elastomeric features at low and at high temperatures, good processability at the detachment from the molds after curing (see U.S. Pat. No. 5,260,393). The glass transition temperature (Tg) is higher than −35° C., the chemical resistance is poor.

Patent application EP 1,148,072 describes fluorovinylethers allowing to lower the Tg of fluoroelastomers. According to this application, the prior art fluoroelastomers do not show the combination of chemical resistance and good elastomeric behaviour at both low and high temperatures. However the fluoroelastomers of this patent application are characterized neither by their mechanical and elastomeric properties nor by the chemical resistance. Besides these fluoroelastomers show —COF end groups which, as said, worsen the mechanical properties at high temperatures and the thermal resistance of the polymers.

EP 1,304,341 describes fluoroelastomers containing fluoroalkoxyvinylethers of formula $CFX_A=CX_AOCF_2OR_A$, wherein $X_A=F, H$; $R_A$ is $C_2$-$C_6$ perfluoroalkyl, perfluoroxyalkyl or $C_5$-$C_6$ cyclic (per)fluoroalkyl. In particular the following perfluoroalkoxyvinylethers are mentioned: $CF_2=CFOCF_2OCF_2CF_3$ (MOVE 1) and $CF_2=CFOCF_2OCF_2CF_2OCF_3$ (MOVE 2). In the Examples fluoroelastomers containing no more than 19% of these perfluoroalkoxyvinylethers are described. Tests carried out by the Applicant have shown that said fluoroelastomers have —COF type polymer end groups. As said, the terminal groups worsen the mechanical properties at high temperatures and the thermal resistance of said polymers.

The need was felt to have available VDF fluoroelastomers having the following combination of properties:

Tg between −10° C. and −35° C., preferably between −20° C. and −34° C., more preferably between −25° C. and −34° C., substantially free from —COF polymer end groups, said end groups not being detectable by the method indicated hereinafter;

improved chemical resistance to hydrocarbons additivated with polar substances, according to the method reported hereinafter, and to the bases;

improved mechanical properties and compression set in a wide range of temperatures, at high and at low temperatures;

improved productivity in the process for preparing the fluoroelastomers, expressed as kg polymer/hour×liter of water.

The Applicant has unexpectedly and surprisingly found fluoroelastomers solving this technical problem.

An object of the present invention are VDF curable fluoroelastomers, having a glass transition temperature between −10° C. and −35° C., preferably between −20° C. and −35° C., more preferably between −25° C. and −34° C., comprising:
A) VDF;
B) monomer of formula:

$$CF_2=CFOCF_2OCF_3 \qquad (a);$$

C) one or more comonomers selected from: tetrafluoroethylene (TFE), perfluoromethylvinylether (PMVE), perfluoropropene (HFP);

and having improved mechanical properties and compression set in a wide range of temperatures, both at high and at low temperatures, and an improved chemical resistance according to the tests described hereinafter when the Tg is equal, and an improved Tg when the chemical resistance is equal, and an amount of —COF polymer end groups, bands at 1,900-1,830 $cm^{-1}$ lower than the sensitivity limit of the following method: at the end of the polymerization of the monomer the polymer is isolated through coagulation by freezing and subsequent defrosting; then the polymer is washed twice with demineralized water and dried in stove up to a constant weight; the —COF polymer end groups are determined by FT-IR spectroscopy on a polymer film having a thickness from 50 to 300 micron by initially scanning between 4000 $cm^{-1}$ and 400 $cm^{-1}$ to obtain the initial spectrum, keeping the film for 12 hours in an environment saturated with ammonia vapours, and then recording the IR final spectrum under the same conditions of the initial IR spectrum; subtraction from the initial spectrum the final spectrum to obtain the "difference spectrum", which is normalized by the following equation:

$$\frac{\text{"Difference spectrum"}}{[\text{film weight}(g)/\text{film area}(cm^2)]};$$

then the optical densities related to the —COF end groups which have reacted with the ammonia vapours are measured and converted into mmoles/kg of polymer using the extinction coefficients reported in Table 1, page 73 of the article by M. Pianca et Al. "End groups in fluoropolymers", J. Fluorine Chem. 95 (1999), 71-84 (herein incorporated by reference); the found values express the concentrations of the residual —COF end groups as mmoles of end groups —COF/Kg of polymer: in the fluoroelastomer spectrum of the invention no bands related to —COF end groups (1900-1830 $cm^{-1}$) are detectable, the method sensitivity limit being 0.05 mmoles/Kg.

More in particular the —COF end group amount in the polymer is determined by using the Nicolet® Nexus FT-IR equipment (256 scannings, resolution 2 $cm^{-1}$).

As said, the polymers of the invention are fluoroelastomers. This means that the polymer does not show any crystallinity and therefore does not show melting points at the DSC (Differential Scanning Calorimetry) analysis, in particular melting point of second melting. The VDF fluoroelastomers contain therefore an amount by moles of monomers B) and C) so that the polymer is elastomeric and the Tg is in the above ranges. The Applicant has found unexpectedly and surprisingly that, by using monomer B) the fluoroelastomer Tg can even reach very low values; so that, in order to reach the above mentioned Tg values, one or more monomers B) are added. Further, the chemical resistance is higher, the Tg in the above range being equal, as a lower amount of VDF is present.

With chemical resistance according to the present invention it is meant that the fluoroelastomers substantially maintain the initial properties after treatment with hydrocarbons added with polar solvents, for example methanol, and after contact with organic and inorganic bases.

Preferably the VDF fluoroelastomers comprise the following monomers (% by moles):

A) from 10 to 80%, preferably from 15 to 70%, more preferably from 20 to 65% of VDF;
B) from 1 to 65%, preferably from 3 to 50%, more preferably from 5 to 30%;
C) from 1 to 60%, preferably from 3 to 40%, more preferably from 5 to 30% of one or more monomers of this class;

the monomer sum being 100%.

Preferred compositions are the following:
A) VDF: 15-70%, preferably 20-65%;
B) 3-60%, preferably 5-30%;
C) TFE 5-40%, preferably 10-30%;
HFP 0-25%, preferably 0-15%;
PMVE 0-30%, preferably 0-20%;
A) VDF: 15-70%, preferably 20-65%;
B) 3-60%, preferably 5-30%;
C) TFE 0-40%, preferably 0-30%;
HFP 3-25%, preferably 5-20%;
PMVE 0-30%, preferably 0-20%;
A) VDF: 15-70%, preferably 20-65%;
B) 3-60%, preferably 5-30%;
C) TFE 0-40%, preferably 0-30%;
HFP 0-25%, preferably 0-15%;
PMVE 5-30%, preferably 10-20%;
A) VDF: 15-70%, preferably 20-65%;
B) 3-60%, preferably 5-30%;
C) TFE 5-40%, preferably 10-30%;
and
HFP 3-25%, preferably 5-20%;
and
PMVE 5-30%, preferably 10-20%;
A) VDF: 15-70%, preferably 20-65%;
B) 3-60%, preferably 5-30%;
C) TFE 5-40%, preferably 10-30%;
and
HFP 3-25%, preferably 5-20%;
and
PMVE 0-30%, preferably 0-20%;
A) VDF: 15-70%, preferably 20-65%;
B) 3-60%, preferably 5-30%;
C) TFE 5-40%, preferably 10-30%;
and
HFP 0-25%, preferably 0-20%;
and
PMVE 5-30%, preferably 10-20%;
A) VDF: 15-70%, preferably 20-65%;
B) 3-60%, preferably 5-30%;
C) TFE 0-40%, preferably 0-30%;
and
HFP 3-25%, preferably 5-20%;
and
PMVE 5-30%, preferably 10-20%.

In the compositions one or more of the following comonomers can optionally be added (% by moles):
OI 0-30%, preferably 5-20%, wherein OI indicates a hydrogenated olefin from 1 to 5 carbon atoms, preferably ethylene and/or propylene, linear or isomer;

and/or preferably
bis-olefin, as defined below, from 0.01 to 1.0, preferably from 0.03 to 0.5, still more preferably from 0.05 to 0.2 moles per 100 moles of the monomeric units forming the basic structure of the fluoroelastomer; the total sum of the monomers being 100%.

The bis-olefins have general formula:

wherein:

$R_1, R_2, R_3, R_4, R_5, R_6$, equal to or different from each other, are H or $C_1$-$C_5$ alkyls;

Z is a $C_1$-$C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

In formula (I), Z is preferably a $C_4$-$C_{12}$, more preferably $C_4$-$C_8$, perfluoroalkylene radical, while $R_1, R_2, R_3, R_4, R_5, R_6$ are preferably hydrogen; when Z is a (per)fluoropolyoxyalkylene radical, it can comprise units selected from the following:

—$CF_2CF_2O$—, —$CF_2CF(CF_3)O$—, —$CFX_1O$— wherein $X^1$=F, $CF_3$,

—$CF_2CF_2CF_2O$—, —$CF_2$—$CH_2CH_2O$—, —$C_3F_6O$—.

Preferably Z has formula:

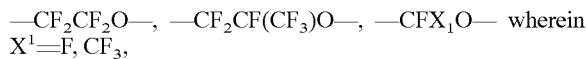

wherein: Q is a $C_1$-$C_{10}$ alkylene or oxyalkylene radical; p is 0 or 1; m and n are numbers such that the m/n ratio, n being different from zero, is between 0.2 and 5 and the number average molecular weight of said (per)fluoropolyoxyalkylene radical is in the range 500-10,000, preferably 700-2,000.

Preferably Q is selected from:

—$CH_2OCH_2$—; —$CH_2O(CH_2CH_2O)_sCH_2$—, s being an integer from 1 to 3.

The bis-olefins of formula (I) wherein Z is an alkylene or cycloalkylene radical can be prepared according to what described, for example, by I. L. Knunyants et al. in Izv. Akad. Nauk. SSSR, Ser. Khim., 1964(2), 384-6. The bis-olefins containing (per)fluoropolyoxyalkylene structures are described in U.S. Pat. No. 3,810,874.

More preferably the bis-olefin has formula:

wherein t0 is an integer from 6 to 10.

The bis-olefin of formula:

is particularly preferred.

The fluoroelastomers of the invention are cured by peroxidic way. When the fluoroelastomers of the invention are cured by peroxidic way, they contain iodine and/or bromine in amounts generally between 0.001% and 5% by weight, preferably between 0.01% and 2.5% by weight with respect to the total polymer weight. The iodine and/or bromine atoms can be present in the chain and/or in end position.

To introduce iodine and/or bromine atoms along the chain, the copolymerization of the basic fluoroelastomer monomers is carried out with a suitable fluorinated comonomer containing iodine and/or bromine (cure-site monomers), see for example U.S. Pat. No. 4,745,165, U.S. Pat. No. 4,831,085, U.S. Pat. No. 4,214,060, EP 683,149. The fluorinated comonomer containing iodine can be selected for example from the following compounds:

(ao) iodo(per)fluoroalkyl-perfluorovinylethers of formula:

wherein $R_f$ is a $C_1$-$C_{12}$ (per)fluoroalkylene, optionally containing chlorine and/or ether oxygen atoms;
for example: $ICF_2$—O—CF=$CF_2$, $ICF_2CF_2$—O—CF=$CF_2$, $ICF_2CF_2CF$—O—CF=$CF_2$, $CF_3CFICF_2$—O—CF=$CF_2$, and the like;

(bo) iodo-(per)fluoroolefins of formula:

wherein $R'_f$ is a $C_1$-$C_{12}$ (per)fluoroalkylene, optionally containing chlorine atoms; for example: iodotrifluoroethylene, 1-iodo-2,2-difluoroethylene, iodo-3,3,4,4-tetrafluorobutene-1,4-iodo-perfluorobutene-1, and the like;

(co) iodo-(per)fluoroolefins of formula:

$$CHR_o=CH-Z_o-CH_2CHR_o-I \quad (V)$$

wherein: $R_o$ is H or —$CH_3$; $Z_o$ is a $C_1$-$C_{18}$ linear or branched (per)fluoroalkylene radical, optionally containing one or more oxygen atoms, or a (per)fluoropolyoxyalkylene radical as defined above.

Other cure-site iodinated comonomers are iodofluoroalkylvinylethers, see U.S. Pat. No. 4,745,165 and U.S. Pat. No. 4,564,662.

Alternatively, or in addition to the iodinated comonomer, the fluoroelastomer can contain iodine atoms in end position, deriving from a suitable iodinated chain transfer agent introduced in the reaction medium during the polymer preparation, as described in U.S. Pat. No. 4,501,869. Said transfer agents have formula $R^A_f(I)_x$, wherein $R^A_f$ is a $C_1$-$C_{12}$ (per)fluoroalkyl radical, optionally containing chlorine atoms, while x is 1 or 2. Said transfer agents can be selected, for example, from: $CF_2I_2$, $I(CF_2)_6I$, $I(CF_2)_4I$, $CF_2ClI$, $CF_3CFICF_2I$, and the like.

For the introduction of iodine as chain end group by the addition of iodinated chain transfer agents, as above, see for example U.S. Pat. No. 4,243,770 and U.S. Pat. No. 4,943,622.

It is also possible to use as chain transfer agents alkaline or alkaline-earth metal iodides, according to what described in patent application EP 407,937.

In combination with the chain transfer agents containing iodine, other known chain transfer agents in the prior art can be used, such as ethyl acetate, diethylmalonate, etc.

The iodine amount in end position of the fluoroelastomer is generally between 0.001% and 3%, preferably between 0.01% and 1% by weight with respect to the fluoroelastomer weight. See U.S. Pat. No. 4,035,565 and U.S. Pat. No. 4,694,045.

Furthermore the curable fluoroelastomers can contain, alternatively or in combination with iodine, also bromine, in the chain and in end position. The bromine in the chain can be introduced according to known techniques; see for example U.S. Pat. No. 4,035,565, U.S. Pat. No. 4,745,165, EP 199,138; or as end bromine as described in U.S. Pat. No. 4,501,869.

Preferably the fluoroelastomer contains iodine atoms in the chain and/or in end position.

Optionally the fluoroelastomers of the invention are mixed with a semicrystalline (per)fluoropolymer in amounts in percent by weight, referred to the total of the dry weight of the mixture fluoroelastomer+semicrystalline (per)fluoropolymer, from 0% to 70% by weight, preferably from 0% to 50% by weight, still more preferably from 2% to 30% by weight.

Semicrystalline (per)fluoropolymer means a (per)fluoropolymer showing, besides the glass transition temperature Tg, at least one crystalline melting temperature.

The semicrystalline (per)fluoropolymer is constituted of tetrafluoroethylene (TFE) homopolymers, or TFE copolymers with one or more monomers containing at least one unsaturation of ethylene type, in amounts from 0.01% to 10% by moles, preferably from 0.05% to 7% by moles.

Said comonomers having an ethylene unsaturation are of hydrogenated and fluorinated type. Among the hydrogenated ones, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:
- $C_3$-$C_8$ perfluoroolefins as hexafluoropropene (HFP), hexafluoroisobutene;
- $C_2$-$C_8$ hydrogenated fluoroolefins as vinyl fluoride (VF), vinylidene fluoride (VDF), trifluoroethylene, $CH_2$=CH—$R_f$ perfluoroalkylethylene, wherein $R_f$ is a $C_1$-$C_6$ perfluoroalkyl;
- $C_2$-$C_8$ chloro- and/or bromo- and/or iodo-fluoroolefins as chlorotrifluoroethylene (CTFE);
- $CF_2$=$CFOR_f$ (per)fluoroalkylvinylethers (PAVE), wherein $R_f$ is a $C_1$-$C_6$ (per)fluoroalkyl, for example $CF_3$, $C_2F_5$, $C_3F_7$;
- $CF_2$=CFOX (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups, for example perfluoro-2-propoxy-propyl; fluorodioxoles, preferably perfluorodioxoles.

PAVEs, in particular perfluoromethyl-, ethyl-, propylvinylether and fluorodioxoles, preferably perfluorodioxoles, are preferred comonomers.

When the fluoroelastomers of the present invention contain semicrystalline (per)fluoropolymers, mixing is carried out by mixing in the desired ratios the fluoroelastomer latex with the semicrystalline perfluoropolymer latex and then co-coagulating the obtained mixture as described in U.S. Pat. No. 6,395,834 and U.S. Pat. No. 6,310,142.

Alternatively the semicrystalline (per)fluoropolymer can be polymerized and then the fluoroelastomer is polymerized on the (per)fluoropolymer particles. A core-shell structure is thus obtained.

As said, with elastomeric polymers it is meant that at DSC they do not show melting peaks, as the crystalline part must be substantially absent.

As said, the fluoroelastomers of the invention show the improved combination of the above described properties: a good elastic behaviour at low temperatures, as for example shown by TR10 (ASTM D 1329), combined with a good chemical resistance in hydrocarbons added with polar substances and to both organic and inorganic bases.

The fluoroelastomers of the present invention compared with the prior art fluoroelastomers having Tg comprised between −10° C. and −35° C., the comparison being carried out at the same Tg, show improved chemical resistance. (See the Examples).

The Applicant has unexpectedly and surprisingly found that the fluoroelastomers of the present invention are obtained with high polymerization kinetics and therefore it is possible to obtain copolymers having a high molecular weight. The fluoroelastomers of the present invention are obtainable with high yields and therefore make useless, at the end of the polymerization, the recovery of the unreacted monomers. This allows to simplify the production plant, the expensive recovery methods of unreacted monomers not being necessary.

The fluoroelastomers are prepared by polymerization of the monomers in aqueous emulsion in the presence of an emulsion, dispersion or microemulsion of perfluoropolyoxyalkylenes, according to what described in U.S. Pat. No. 4,789,717 and U.S. Pat. No. 4,864,006. Preferably the synthesis is carried out in the presence of a perfluoropolyoxyalkylene microemulsion.

According to well known methods of the prior art, radical initiators, for example persulphates, perphosphates, alkaline or ammonium perborates or percarbonates, optionally in combination with ferrous, cuprous or silver salts, or other easily oxidizable metals, are used. In the reaction medium also surfactants of various kind are optionally present, among which fluorinated surfactants of formula:

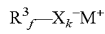

are particularly preferred, wherein $R^3_f$ is a $C_5$-$C_{16}$ (per)fluoroalkyl chain or (per)fluoropolyoxyalkyl chain, $X_k^-$ is —COO⁻ or —SO₃⁻, M⁺ is selected among: H⁺, NH₄⁺, or an alkaline metal ion. Among the most commonly used we remember: ammonium perfluorooctanoate, (per)fluoropolyoxyalkylenes ended with one or more carboxylic groups, etc. See U.S. Pat. No. 4,990,283 and U.S. Pat. No. 4,864,006.

The polymerization reaction is generally carried out at temperatures between 25° C. and 150° C., at a pressure between the atmospheric one up to 10 MPa.

In alternative or in combination with the chain transfer agents containing iodine and/or bromine, other known chain transfer agents in the prior art as ethyl acetate, diethyl-malonate, ethane, etc., can be used.

As said, the fluoroelastomers of the present invention are cured by peroxidic way. In the peroxidic curing, preferably the fluoroelastomer contains in the chain and/or in end position to the macromolecule iodine and/or bromine atoms.

To the curing blend the following compounds are added:
peroxides capable to generate radicals by heating, for example: dialkylperoxides, in particular di-terbutyl-peroxide and 2,5-dimethyl-2,5-di(terbutylperoxy)hexane; dialkylarylperoxides as, for example, dicumyl peroxide; dibenzoyl peroxide; diterbutyl perbenzoate; di[1,3-dimethyl-3-(terbutylperoxy)butyl]-carbonate. Other peroxidic systems are described, for example, in patent applications EP 136,596 and EP 410,351.
The peroxide amount is generally from 0.5% to 10% by weight with respect to the polymer, preferably 0.6%-4% by weight;
curing coagents, in amounts generally between 0.5 and 10%, preferably between 1 and 7%, by weight with respect to the polymer; among them, bis-olefins of formula (I); triallyl-cyanurate, triallyl-isocyanurate (TAIC), tris-(diallylamine)-s-triazine; triallylphosphite; N,N-diallyl-acrylamide; N,N,N',N'-tetraallyl-malonamide; tri-vinyl-isocyanurate; 4,6-tri-vinyl-methyl-trisiloxane, etc., are commonly used: TAIC and the bis-olefin of formula $$CH_2=CH-(CF_2)_6-CH=CH_2$$

are particularly preferred;

optionally
a metal compound, in amounts between 1 and 15%, preferably from 2 to 10% by weight with respect to the polymer, selected from divalent metal oxides or hydroxides as, for example, Mg, Zn, Ca or Pb, optionally combined with a weak acid salt as stearates, benzoates, carbonates, oxalates or phosphites of Ba, Na, K, Pb, Ca;
other conventional additives, such as mineral fillers, semicrystalline fluoropolymers in powder, pigments, antioxidants, stabilizers and the like.

The semicrystalline (per)fluoropolymers, optional components of the present invention, are prepared according to the emulsion or microemulsion polymerization methods described above for the fluoroelastomers of the invention.

The monomer of formula (a) $CF_3OCF_2OCF=CF_2$ can be prepared by the following process:
I reaction in liquid phase of the fluoroformate $CF_3OCOF$ with elemental fluorine and olefinic compounds having formula:

$$CAF=CA'F \qquad (IV)$$

to obtain the fluorohalogenether of formula:

$$CF_3OCF_2OCFACF_2A' \qquad (V)$$

wherein A and A', equal to or different the one from the other, are H, Cl or Br, with the proviso that they are not both H; the temperature ranging from −120° C. to −20° C., preferably from −100° C. to −40° C., optionally one operates in the presence of a perhalogenated solvent, liquid and inert under the reaction conditions, optionally the fluorine is diluted with an inert gas, for example, nitrogen or helium;
II dehalogenation, when A and A' are both halogen, or dehydrohalogenation, when one of A or A' is hydrogen and the other is halogen of compound (V).

The dehalogenation or dehydrohalogenation reactions used are well known in the prior art. The molar ratio $CF_3OF$/CO is between 0.1 and 10, preferably between 0.2 and 5, more preferably between 0.5 and 2. The optional perhalogenated solvent used in the fluorination of the fluoroformate step I, is preferably an organic compound containing fluorine and/or chlorine, optionally one or more oxygen atoms in the chain and/or aminic groups at the ends thereof. When the perhalogenated solvent is perfluorinated, it can, for example, be selected among perfluorocarbons, perfluoroethers, perfluoropolyethers, perfluoroamines, or respective mixtures.

The fluoroformate $CF_3OCOF$ can be prepared with high conversion and selectivity by thermal reaction in gaseous phase of $CF_3OF$ (fluoroxyperfluoromethane) and CO by feeding the reactants in a reactor maintained at temperatures between 80° C. and 250° C., preferably between 120° C. and 230° C., still more preferably between 150° C. and 200° C.

The reaction mixture containing $CF_3OCOF$ can directly be fed, without separation of the mixture components, in the reactor of step 1. In this way the whole process results particularly simple and effective. As said, the $CF_3OF$ conversion and the selectivity to $CF_3OCOF$ are high. (See the Examples).

In the described process for preparing CF$_3$OCOF by increasing the reaction temperature in the range 80° C.-250° C., the conversion increases but a high selectivity is substantially maintained.

Another process for preparing CF$_3$OCOF is by photochemical route in liquid phase in the presence of ultraviolet radiations at temperatures between 0° C. and 100° C., preferably between 20° C. and 50° C., by feeding the two reactants into a reactor equipped with a mercury high pressure UV lamp, contained in a cooled quartz sheath, immersed in the reaction mixture. The Applicant has found that this process has a high selectivity. Further higher yields are obtained compared with the reaction carried out in gaseous phase. This process is carried out in the presence of an inert perfluorinated solvent and at the liquid state under the reaction conditions, preferably selected from perfluorocarbons, perfluoropolyethers, perfluorinated tertiary amines, fluorochlorocarbons, or mixtures thereof.

In the process for preparing CF$_3$OCOF, when the CF$_3$OF conversion is not quantitative, the gaseous flow coming out from the reactor contains a mixture formed of the reaction product together with unconverted reactants. CF$_3$OF can be removed by passing the gaseous flow into a cold trap containing a fluorinated olefin, for example CFCl=CFCl. The latter reacts with CF$_3$OF forming a fluorohalogenether; then, by fractional distillation, CF$_3$OCOF is separated and it is available for step 1.

Alternatively the gaseous flow coming out from the reactor can be cooled down to condensate the fluoroformate CF$_3$OCOF, then separating CF$_3$OF and CO and their recycle into the reactor by keeping the CF$_3$OF/CO ratio in the above limits.

Preferably CF$_3$OCOF is prepared by reacting the fluorooxyperfluoromethane and carbon monoxide at temperatures from 80° C. to 250° C.

The reactor where CF$_3$OCOF is prepared, is preferably made glass, inert perfluorinated plastics as for example PTFE, PFA, metal alloys as for example AISI 316, preferably coated, where the reaction takes place, with glass or perfluorinated plastics. More preferably glass or fluorinated plastics are used.

The fluoroelastomers of the present invention, as said, show a Tg between –10° C. and –35° C., are substantially free from —COF end groups and have an improved combination of chemical resistance as above defined and of mechanical properties and compression set in a wide range of temperatures, both at high and at low temperatures.

A further object of the present invention are manufactured articles obtainable by curing VDF-based fluoroelastomers.

Said manufactured articles are usable from temperatures higher than –35° C. up to 250° C. and show improved mechanical and elastomeric and chemical resistance properties.

The Applicant has found that, if the amount of —COF end groups in the fluoroelastomer, after polymerization, is substantially absent according to the above analysis method, the best combination of mechanical properties and compression set is obtained in a wide range of temperatures, both at high and at low temperatures.

When desired, the fluoroelastomers of the present invention, having an amount of —COF end groups lower than 0.05 mmoles/Kg and Tg as above defined, can be mixed with fluoroelastomers containing an amount of —COF end groups higher than 0.05 mmoles/Kg.

Preferably the amount of the fluoroelastomers of the present invention is at least 5-10% by weight, preferably 20-40% by weight, more preferably 50% by weight, with respect to the total weight of the fluoroelastomers in the composition comprising also the fluoroelastomers showing —COF end groups.

These compositions can be obtained in various ways. For example, when monomers giving —COF end groups are used in polymerization, for example perfluoropropylvinylether, in order to obtain improved properties according to the present invention, a portion of the polymerization is carried out in the absence of the comonomers which give —COF polymer end groups, so to obtain a polymer fraction substantially —COF end group free, allowing to obtain an improved combination of the above properties. For example, the polymer fraction —COF end group free must be at least 5-10% by weight, preferably 20-40% by weight, more preferably 50% by weight. An alternative procedure is to mix the polymer fraction substantially —COF end group free with polymers containing —COF in the above ratios.

The fluoroelastomeric polymers containing —COF end groups in amounts higher than 0.05 mmoles/Kg comprise the following comonomers:

(per)fluorodioxoles, preferably having the following formula:

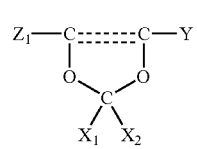

(2)

wherein

Y=F, ORf$_1$, Rf$_1$ being a C$_1$-C$_5$ perfluoroalkyl group, preferably Rf$_1$ is CF$_3$;

X$_1$ and X$_2$, equal to or different from each other are selected between F and CF$_3$, preferably F;

Z$_1$ is selected from F, H, Cl, preferably F;

perfluoroalkylvinylethers of formula CF$_2$=CFORf, wherein Rf is a C$_3$ perfluoroalkyl group;

CF$_2$=CFOXa perfluorooxyalkylvinylethers, wherein Xa is C$_3$-C$_{12}$ perfluoroxyalkyl group having one or more ether groups, for example perfluoro-2-propoxy-propyl;

fluorovinylethers (MOVE) of general formula CFX$_{Al}$=CX$_{Al}$OCF$_2$OR$_{Al}$ (A-I), wherein R$_{Al}$ is a linear or branched C$_2$-C$_6$ (per)fluoroalkyl group or C$_5$-C$_6$ cyclic group, or a linear or branched when possible C$_2$-C$_6$ (per)fluorooxyalkyl group, containing from one to three oxygen atoms; when R$_{Al}$ is fluoroalkyl or fluorooxyalkyl group as above it can contain from 1 to 2 atoms, equal or different, selected from the following: H, Cl, Br, I; X$_{Al}$=F, H; the compounds of general formula CFX$_{Al}$=CX$_{Al}$OCF$_2$—OCF$_2$CF$_2$Y$_{Al}$ (A-II), wherein Y$_{Al}$=F, OCF$_3$; X$_{Al}$ as above; in particular (MOVE 1) CF$_2$=CFOCF$_2$OCF$_2$CF$_3$ (A-III) and (MOVE 2) CF$_2$=CFOCF$_2$OCF$_2$CF$_2$OCF$_3$ (A-IV), are preferred.

The mixture of the two fluoroelastomers, one containing —COF end groups and the other —COF eng group free, can be obtained directly in polymerization by adding one or more comonomers giving —COF end groups.

The following Examples illustrate with non limitative purposes the present invention.

EXAMPLES

Analytical Methods

Determination of the Polymer Tg

The Tg has been determined by DSC analysis according to the ASTM D 3418 method. The Tg values reported in the Examples are the mid-point Tg.

Determination of the —COF Polar End Groups

At the end of the polymerization of the monomer, the polymer is isolated through coagulation by freezing at −20° C. and subsequent defrosting at room temperature until obtaining a slurry wherein the polymer deposits on the bottom; then the polymer is washed twice with demineralized water and dried in stove at 90° C. until a constant weight (about 12 hours); the —COF polymer end groups are determined by FT-IR spectroscopy by using the Nicolet® Nexus FT-IR equipment (256 scannings, resolution 2 $cm^{-1}$) on a polymer film having a thickness from 50 to 300 micron by initially scanning between 4000 $cm^{-1}$ and 400 $cm^{-1}$ to obtain the initial spectrum, keeping the film for 12 hours in an environment saturated with ammonia vapours, and then recording the IR final spectrum under the same conditions of the initial IR spectrum; subtraction from the initial spectrum the final spectrum to obtain the "difference spectrum" which is normalized by the following equation:

$$\frac{\text{"Difference spectrum"}}{[\text{film weight}(g)/\text{film area}(cm^2)]};$$

then the optical densities related to the —COF end groups which have reacted with the ammonia vapours are measured (—COF end groups), which with this reactant give rise to detectable peaks; the optical densities are converted into mmoles/kg of polymer using the molar extinction coefficient of the —COF group at 1884 $cm^{-1}$, equal to 215 liters/(moles× cm), as reported in Table 1, page 73 of the article by M. Pianca et Al. "End groups in fluoropolymers", J. Fluorine Chem. 95 (1999), 71-84 (herein incorporated by reference); the found values express the concentrations of the residual —COF end groups as mmoles of end groups —COF/Kg of polymer: in the fluoroelastomer spectrum of the invention no bands related to —COF end groups (1900-1830 $cm^{-1}$) are detectable, the method sensitivity limit being 0.05 mmoles/Kg.

Chemical Resistance to Hydrocarbons Added with Polar Substances

The ASTM D 471 standard is used.

The solvent M 15 (Fuel I), which is a mixture Fuel C+methanol containing 15% by volume of anhydrous methanol, is used. The specimen was kept immersed in the mixture for 168 h at 40° C.

Example A

Preparation of $CF_3OCOF$ by Thermal Reaction at 170° C. in Glass Reactor

A tubular glass reactor is used, having an inner diameter of 55.6 mm and length of 510 mm, filled in with 6×6 glass Raschig rings (free internal volume 842 ml), maintained thermostated by electrical resistances.

In the reactor, maintained at the temperature of 170° C., a gaseous flow of $CF_3OF$ (1.5 liters/hour), synthesized as described in U.S. Pat. No. 4,400,872 and, contemporaneously, a CO flow (1.5 liters/hour), are fed for 5 hours. The flow coming out from the reactor is continuously analyzed by in line gaschromatographic analysis.

The flow coming out from the reactor is condensed, except CO, in a trap maintained at −110° C. containing 15 g of CFCl=CFCl (A 1112), so that the residual $CF_3OF$ reacts with the olefin to give $CF_3OCFClCF_2Cl$.

After fractional distillation of the resulting mixture, 33.9 g of $CF_3OCOF$ pure at 99.8% (molar yield on the fed $CF_3OF$ 76.5%); 12.3 g of $CF_3OCFClCF_2Cl$; 3.4 g of $COF_2$ are obtained. The conversion is 84.5% and the selectivity 90%, calculated on the fed $CF_3OF$.

Example B

Preparation of $CF_3OCOF$ by Thermal Reaction at 170° C. in PTFE Reactor

A PTFE tubular thermostated reactor is used, having an internal diameter of 4 mm and length of 13.2 m.

A gaseous flow of $CF_3OF$ (1.5 liters/hour) and, contemporaneously, a flow of CO (2.0 liters/hour) are fed in the reactor, maintained at the temperature of 170° C.

The flow coming out from the reactor, analyzed by gaschromatography, has the following molar composition: 7.3% $CF_3OF$, 54.2% $CF_3OCOF$, 9.1% $COF_2$ and 29.4% CO.

Example C

Preparation of $CF_3OCOF$ by Thermal Reaction at 120° C. in PTFE Reactor

A gaseous flow of $CF_3OF$ (1.5 liters/hour) and, contemporaneously, a flow of CO (2.0 liters/hour) are fed for 6 hours in the same reactor used in the Example B, maintained at the temperature of 120° C. The flow coming out from the reactor is analyzed by gaschromatography and has the following molar composition, leaving out CO in excess: 86.7% $CF_3OF$, 13.3% $CF_3OCOF$.

The flow coming out from the reactor is condensed, except CO, in a trap maintained at −110° C. containing 50 g of A 1112, so that the residual $CF_3OF$ reacts with the olefin.

After fractional distillation of the resulting mixture, 6.8 g of $CF_3OCOF$ pure at 99% are obtained.

The selectivity is 98%, calculated on the converted $CF_3OF$ The conversion is 13.0%.

Example D

Preparation of $CF_3OCOF$ by Thermal Reaction at 170° C. in AISI 316 Reactor

An AISI 316 tubular thermostated reactor is used, having an internal diameter of 4 mm and length of 11.3 m.

A gaseous flow of $CF_3OF$ (1.5 liters/hour) and, contemporaneously, a flow of CO (1.5 liters/hour) are fed for 6 hours in the reactor, maintained at the temperature of 170° C. The gaseous flow coming out from the reactor is condensed in a trap maintained at −110° C. containing 30 g of A 1112.

After fractional distillation of the trap content, 31.2 g of $CF_3OCOF$ pure at 99%, 31.8 g of fluorohalogenether and 3.7 g of $COF_2$ are obtained. The conversion is 66.6% and the selectivity is 86.5%.

Example E

Preparation of CF₃OCOF by Photochemical Reaction 500 g of a perfluoropolyether Galden®LS-165 are fed to a 300 ml cylindrical glass reactor, equipped with stirrer and UV lamp Hanau TQ 150, with 150 W power and 1 cm optical route. Then 2.0 liters/hour of CF₃OF diluted with 3.0 liters/hour of He, and 2.0 liters/hour of CO are fed contemporaneously for 5 hours.

The gases coming out from the reactor are condensed in a trap maintained at −110° C. containing 30 g of A 1112. After fractional distillation of the condensed mixture, 22.9 g of CF₃OCOF pure at 99%, 41.8 g of fluorohalogenether CF₃OCFClCF₂—Cl, 5.8 g of COF₂, 5.4 g of trifluoromethyl carbonate are obtained.

The CF₃OF conversion is 60.5%. The selectivity is 63.6%.

Example F

Obtainment of the Monomer of Formula (a) by Reaction of CF₃OCOF with Elemental Fluorine and a Fluoroolefin of Formula CFCl═CFCl and Subsequent Dehalogenation of the Fluorohalogenether 20 g of CFCl═CFCl (A 1112), 30 g of CF₃OCOF obtained as in the Example A are transferred in a 50 ml glass reactor. The solution formed is maintained at −100° C. and fluorine diluted with nitrogen is bubbled at a flow of 1 liter/hour.

The mass balance at the end of the reaction is 92%, the ¹⁹F-NMR analysis on the reaction crude product (52 g) shows that the fluoroformate conversion is 54% and the selectivity to give the fluorohalogenether CF₃OCF₂OCFClCF₂Cl is 93%. The unreacted fluoroformate is removed from the reaction raw product by adding water, under stirring. It is allowed to reach 25° C., the organic phase is recovered and dried over MgSO₄. The mixture is filtered and the obtained residue is distilled and the fraction of 31.8 g boiling at 74° C. corresponding to the fluorohalogenether pure at 99% is recovered.

The fluorohalogenether dehalogenation is carried out by using an 1 liter flask equipped with mechanical stirrer, thermometer, dropping funnel, distillation column and trap at −78° C. 450 ml of dimethylformamide (DMF), 62 g of zinc in powder and 8.3 g of ZnCl₂ are fed into the flask. The temperature in the suspension is brought to 80° C. and 150 g of the fluorohalogenether isolated in the previous reaction are added. When the addition is over, the mixture is allowed to react for one hour. At the end the temperature is gradually increased up to 120° C. and it is still allowed to react for one hour. At the end it is disconnected and 106 g of the monomer of formula (a) CF₃OCF₂OCF═CF₂ pure at 99% (boiling point 23° C.) are recovered therefrom.

Example 1

Preparation of the Microemulsion

One liter of microemulsion is prepared by mixing the following ingredients in the amounts indicated hereinafter:

220.7 ml of a perfluoropolyoxyalkylene having one acid end group with average molecular weight 600 g/mole, of formula:

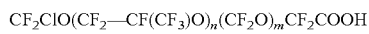

wherein n/m=10;
220.7 ml of an aqueous solution of NH₃ at 30% by volume;
427.6 ml of demineralized water;
131 ml of Galden® D02, having average molecular weight of 450 g/mole, of formula:

wherein n/m=20.

Example 2

Copolymer VDF/TFE/PMVE/Monomer (a) 65/14/16/5% by Moles 3.5 liters of demineralized water and 35 ml of a microemulsion obtained as described in the Example 1 were introduced, after air evacuation, in a 5 liter autoclave equipped with stirrer working at 630 rpm.

The interior of the autoclave was heated to 70° C. and maintained at this temperature for the whole reaction. Then 4.93 g of 1,4-diiodoperfluorobutane ($C_4F_{812}$) were introduced in the autoclave.

The interior of the autoclave is then pressurized at 16 bar (1.6 MPa) with the following mixture of monomers, the composition by moles % being: VDF 57%, TFE 14.5%, PMVE 24%, monomer of formula (a) 4.5%.

Then in the autoclave are introduced:
0.35 g of ammonium persulphate (APS) as initiator;
2.25 g of bis-olefin of formula CH₂═CH—(CF₂)₆—CH═CH₂;
the addition of the compound was carried out for a total of 20 portions, each of 0.113 g, starting from the beginning of the polymerization and for every 5% increase in the monomer conversion.

The pressure of 16 bar (1.6 MPa) is maintained constant for the whole polymerization by feeding the mixture (% by moles): VDF 62%, TFE 16%, PMVE 17%, monomer of formula (a) 5%.

After 94 minutes of reaction, corresponding to 100% of monomer conversion, the autoclave is cooled and the latex discharged.

The latex is coagulated with an ammonium sulphate solution (6 grams of Al₂(SO₄)₃ for each liter of latex) and dried at 90° C. in a circulation air stove for 24 hours.

529 g of polymer are obtained.

The amount of the reacted monomer with respect to that fed results to be 92.7%.

By ¹⁹F-NMR analysis of the polymer hot dissolved in acetone, the molar percentage of the monomer (a) in the polymer equal to 5.1%, of VDF equal to 64.6%, of TFE equal to 14.2% and of PMVE equal to 16.1%, is determined.

The $T_g$ determined by DSC is −31.5° C.

The obtained polymer is mixed in a roll open mixer with the crosslinking additives in ratios in phr as indicated in Table 1. The mechanical, chemical resistance properties, compression set and Tg are reported in Table 1.

Example 3

Copolymer VDF/TFE/HFP/PMVE/Monomer (a) 67/8/9/6/11% by Moles 3.5 liters of demineralized water and 35 ml of a microemulsion obtained as described in the Example 1 were introduced, after air evacuation, in a 5 liter autoclave equipped with stirrer working at 630 rpm.

The interior of the autoclave was heated to 70° C. and maintained at this temperature for the whole reaction. Then 7.39 g of 1,4-diiodoperfluorobutane ($C_4F_8I_2$) were introduced in the autoclave.

The interior of the autoclave is then pressurized at 16 bar (1.6 MPa) with the following mixture of monomers, the composition by moles % being: VDF 51.5%, TFE 4%, HFP 24.5%. PMVE 8%, monomer of formula (a) 12%.

Then in the autoclave are introduced:
0.35 g of ammonium persulphate (APS) as initiator;
3.38 g of bis-olefin of formula $CH_2=CH-(CF_2)_6-CH=CH_2$;
the addition of the compound was carried out for a total of 20 portions, each of 0.169 g, starting from the beginning of the polymerization and for every 5% increase in the monomer conversion.

The pressure of 16 bar (1.6 MPa) is maintained constant for the whole polymerization by feeding the mixture (% by moles): VDF 65%, TFE 7%, HFP 13%, PMVE 5%, monomer of formula (a) 10%.

After 173 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in a circulation air stove for 24 hours.

894 g of polymer are obtained.

The amount of the reacted monomer with respect to that fed results to be 86.7%.

By $^{19}$F-NMR analysis of the polymer hot dissolved in acetone, the molar percentage of the monomer (a) in the polymer equal to 10.7%, of VDF equal to 66.8%, of TFE equal to 7.7%, of HFP equal to 9.0%, of PMVE equal to 5.8%, is determined.

The $T_g$ determined by DSC is −33.4° C.

The obtained polymer is mixed in a roll open mixer with the crosslinking additives in ratios in phr as indicated in Table 1. The mechanical, chemical resistance properties, compression set and Tg are reported in Table 1.

Example 4

Copolymer VDF/TFE/HFP/Monomer (a) 59/19/8/14% by Moles 3.0 liters of demineralized water and 30 ml of a microemulsion obtained as described in the Example 1 were introduced, after air evacuation, in a 5 liter autoclave equipped with stirrer working at 630 rpm.

The interior of the autoclave was heated to 70° C. and maintained at this temperature for the whole reaction. Then 4.93 g of 1,4-diiodoperfluorobutane ($C_4F_8I_2$) were introduced in the autoclave.

The interior of the autoclave is then pressurized at 16 bar (1.6 MPa) with the following mixture of monomers, the composition by moles % being: VDF 52.0%, TFE 20%, HFP 17.5%. monomer of formula (a) 10.5%.

Then in the autoclave are introduced:
0.30 g of ammonium persulphate (APS) as initiator.

The pressure of 16 bar (1.6 MPa) is maintained constant for the whole polymerization by feeding the mixture (% by moles): VDF 59.5%, TFE 19%, HFP 12%, monomer of formula (a) 9.5%.

After 118 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in a circulation air stove for 24 hours.

568 g of polymer are obtained.

By $^{19}$F-NMR analysis of the polymer hot dissolved in acetone, the molar percentage of the monomer (a) in the polymer equal to 14.3%, of VDF equal to 58.7%, of TFE equal to 19.1%, of HFP equal to 7.9%, is determined.

The $T_g$ determined by DSC is −34.4° C.

The obtained polymer is mixed in a roll open mixer with the crosslinking additives in ratios in phr as indicated in Table 1. The mechanical, chemical resistance properties, compression set and Tg are reported in Table 1.

Example 5 Comparative

The industrial polymer trade mark PL455® marketed by Solvay Solexis is used.

By $^{19}$F-NMR analysis of the polymer hot dissolved in acetone, the molar percentage of the monomers in the polymer is the following: VDF 78.5%, TFE 4%, PMVE 17.5%.

La $T_g$ determined by DSC is −33.0° C.

The obtained polymer is mixed in a roll open mixer with the crosslinking additives in ratios in phr as indicated in Table 1. The mechanical, chemical resistance properties, compression set and Tg are reported in Table 1.

Example 6 Comparative

Copolymer VDF/TFE/HFP/MOVE 1 60/19/6.5/14.5 (% Moles)

The polymer was obtained by repeating the Example 4 but by using MOVE 1 instead of MOVE 3.

By IR analysis the polymer results to contain —COF end groups in an amount higher than 0.05 mmoles/Kg.

Comments to Table 1

The Table shows that, the Tg being equal, the chemical resistance properties, meant as a variation of the hardness, a variation of the weight and a variation of volume, result better for the fluoroelastomers of the invention in comparison with fluoroelastomers of the prior art. In case of the Example 4, besides the improved chemical resistance properties, the fluoroelastomer shows also a lower Tg.

TABLE 1

| Examples | 2 | 3 | 4 | 5 comp |
|---|---|---|---|---|
| Formulation: | | | | |
| Luperco 101 XL 45 phr | 2 | 2 | 2 | 2 |
| Drimix TAIC 75% phr | 5 | 5 | 5 | 5 |
| ZnO phr | 5 | 5 | 5 | 5 |
| Black MT N990 | 30 | 30 | 30 | 30 |
| Mechanical properties after post-cure at 230° C. for 1 + 4 h (ASTM D 412-83) | | | | |
| M100 Mpa | 6.1 | 5.7 | 6.1 | 4.6 |
| Stress at break Mpa | 16.4 | 17.1 | 16.9 | 18.0 |
| elong. at break % | 199 | 214 | 191 | 227 |
| Hardness Shore A | 69 | 67 | 71 | 71 |
| Variation of the properties after ageing in M15 after 168 h at 40° C. | | | | |
| Δ hardness (points) | −5 | −4 | −2 | −9 |
| Δ weight (%) | 6.5 | 5.1 | 2 | 10.1 |
| Δ Volume (%) | 15.8 | 12.3 | 7.1 | 23.5 |

TABLE 1-continued

| Examples | 2 | 3 | 4 | 5 comp |
|---|---|---|---|---|
| Compression set 200° C. for 70 h O-ring (ASTM D 395) (%) | 21 | 20 | 21 | 27 |
| Tg (° C.) | −31.5 | −33.4 | −34.4 | −33 |

The invention claimed is:

1. VDF curable fluoroelastomers comprising:
   A) VDF;
   B) a monomer of formula (a):

$CF_2=CFOCF_2OCF_3$;

C) one or more comonomers selected from the group consisting of: tetrafluoroethylene (TFE), perfluoromethylvinylether (PMVE), and perfluoropropene (HFP);
   wherein the curable fluoroelastomers are non-crystalline and have a glass transition temperature between −10° C. and −35° C. and wherein the amount of —COF polymer end groups in the curable fluoroelastomers is lower than 0.05 mmoles/kg.

2. Curable fluoroelastomers according to claim 1, comprising the following monomers (% by moles):
   A) from 10 to 80% of VDF;
   B) from 1 to 65% of the monomer of formula (a); and
   C) from 1 to 60% of one or more comonomers selected from the group consisting of: TFE, PMVE, and HFP;
   the monomer sum being 100%.

3. Curable fluoroelastomers according to claim 1 having a composition (% by moles) selected from the group consisting of:
   A) VDF: 15-70%,
   B) the monomer of formula (a): 3-60%,
   C) TFE 5-40%,
      HFP 0-25%,
      PMVE 0-30%;
   A) VDF: 15-70%,
   B) the monomer of formula (a): 3-60%,
   C) TFE 0-40%,
      HFP 3-25%,
      PMVE 0-30%,
   A) VDF: 15-70%,
   B) the monomer of formula (a): 3-60%,
   C) TFE 0-40%,
      HFP 0-25%,
      PMVE 5-30%,
   A) VDF: 15-70%,
   B) the monomer of formula (a): 3-60%,
   C) TFE 5-40%
      HFP 3-25%
      PMVE 5-30%;
   A) VDF: 15-70%,
   B) the monomer of formula (a): 3-60%,
   C) TFE 5-40%,
      HFP 3-25%,
      PMVE 0-30%,
   A) VDF: 15-70%,
   B) the monomer of formula (a): 3-60%,
   C) TFE 5-40%,
      HFP 0-25%,
      PMVE 5-3010; and
   A) VDF: 15-70
   B) the monomer of formula (a): 3-60%,
   C) TFE 0-40%,
      HFP 3-25%,
      PMVE 5-30%.

4. Curable fluoroelastomers according to claim 1, comprising (% by moles):
   OI 0-30% wherein OI is a hydrogenated olefin from 1 to 5 carbon atoms; and/or
   bis-olefin, from 0.01 to 1.0 moles per 100 moles of the monomeric units forming the basic structure of the fluoroelastomer, wherein the bis-olefin has a general formula:

$$R_1R_2C=C\underset{R_3}{|}-Z-\underset{R_4}{|}C=CR_5R_6 \qquad (I)$$

wherein:
   $R_1$, $R_2$, $R_3$, $R_4$, $R_5$, and $R_6$, equal to or different from each other, are H or $C_1$-$C_5$ alkyls;
   Z is a $C_1$-$C_{18}$ linear or branched alkylene or cycloalkylene radical, optionally containing oxygen atoms, optionally at least partially fluorinated, or a (per)fluoropolyoxyalkylene radical;
   the total sum of the monomers being 100%.

5. Curable fluoroelastomers according to claim 4, wherein, in formula (I), Z is a $C_4$-$C_{12}$ perfluoroalkylene radical or a (per)fluoropolyoxyalkylene radical, and $R_1$, $R_2$, $R_3$, $R_4$, $R_5$, $R_6$, are hydrogen; and when Z is a (per)fluoropolyoxyalkylene radical, Z comprises units selected from the group consisting of:
   —$CF_2CF_2O$—, —$CF_2CF(CF_3)O$—, —$CFX_1O$— wherein $X_1$=F, $CF_3$,
   —$CF_2CF_2CF_2O$—, —$CF_2$—$CH_2CH_2O$— and —$C_3F_6O$—.

6. Curable fluoroelastomers according to claim 4, wherein Z has formula:

$-(Q)_p-CF_2O-(CF_2CF_2O)_m(CF_2O)_n-CF_2-(Q)_p$ (II)

wherein: Q is a $C_1$-$C_{10}$ alkylene or oxyalkylene radical; p is 0 or 1; m and n are numbers such that the m/n ratio is between 0.2 and 5, and n is not zero, and the number average molecular weight of said (per)fluoropolyoxyalkylene radical is in the range 500-10,000.

7. Curable fluoroelastomers according to claim 6, wherein Q is selected from the group consisting of: —$CH_2OCH_2$— and —$CH_2$—$O(CH_2CH_2O)_s$, $CH_2$—, s being an integer from 1 to 3.

8. Curable fluoroelastomers according to claim 4, wherein the bis-olefin has formula:

$CH_2=CH-(CF_2)_{10}-CH=CH_2$ wherein t0 is an integer from 6 to 10.

9. Curable fluoroelastomers according to claim 4, wherein the bis-olefin has formula:

$CH_2=CH-(CF_2)_6-CH=CH_2$ (b).

10. Curable fluoroelastomers according to claim 1, containing iodine and/or bromine.

11. Curable fluoroelastomers according to claim 10, wherein the iodine and/or bromine atoms are in the chain and/or in end position.

12. Curable fluoroelastomers according to claim 1, further comprising in a mixture therewith, a semicrystalline (per)fluoropolymer in amounts, in percent by weight referring to the total dry weight of the mixture of the fluoroelastomer and the semicrystalline (per)fluoropolymer, up to 70% by weight.

13. Curable fluoroelastomers according to claim 12, wherein the semicrystalline (per)fluoropolymer is formed of tetrafluoroethylene (TFE) homopolymers, or TFE copolymers with one or more monomers containing at least one unsaturation of ethylene type, in amounts from 0.01% to 10% by moles, said comonomers with an ethylene unsaturation being of hydrogenated and fluorinated type.

14. Curable fluoroelastomers according to claim 13, wherein the hydrogenated comonomers are selected from the group consisting of: ethylene, propylene, acrylic monomers, and styrene monomers.

15. Curable fluoroelastomers according to claim 13, wherein the fluorinated comonomers are selected from the group consisting of:

$C_3$-$C_8$ perfluoroolefins;

$C_2$-$C_8$ hydrogenated fluoroolefins; $CH_2=CH-R_f$ perfluoroalkylethylene, wherein $R_f$ is a $C_1$-$C_6$ perfluoroalkyl;

$C_2$-$C_8$ chloro- and/or bromo- and/or iodo-fluoroolefins;

$CF_2=CFOR_f$ (per)fluoroalkylvinylethers (PAVE), wherein $R_f$ is a $C_1$-$C_6$ (per)fluoroalkyl;

$CF_2=CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups, and fluorodioxoles.

16. Curable fluoroelastomers according to claim 12, wherein the comonomers are PAVES and fluorodioxoles.

17. Cured fluoroelastomers obtainable by curing the fluoroelastomers of claim 1.

18. Manufactured articles obtainable by curing the fluoroelastomers of claim 1.

* * * * *

UNITED STATES PATENT AND TRADEMARK OFFICE
CERTIFICATE OF CORRECTION

| | | |
|---|---|---|
| PATENT NO. | : 7,834,097 B2 | Page 1 of 1 |
| APPLICATION NO. | : 12/162099 | |
| DATED | : November 16, 2010 | |
| INVENTOR(S) | : Margherita Albano et al. | |

It is certified that error appears in the above-identified patent and that said Letters Patent is hereby corrected as shown below:

Title Page:

Item (87)    PCT Pub. No., please correct the PCT Pub. No. to read as follows:

(87)    WO2007/085545

Signed and Sealed this
Fifth Day of April, 2011

David J. Kappos
*Director of the United States Patent and Trademark Office*